Patented July 31, 1928.

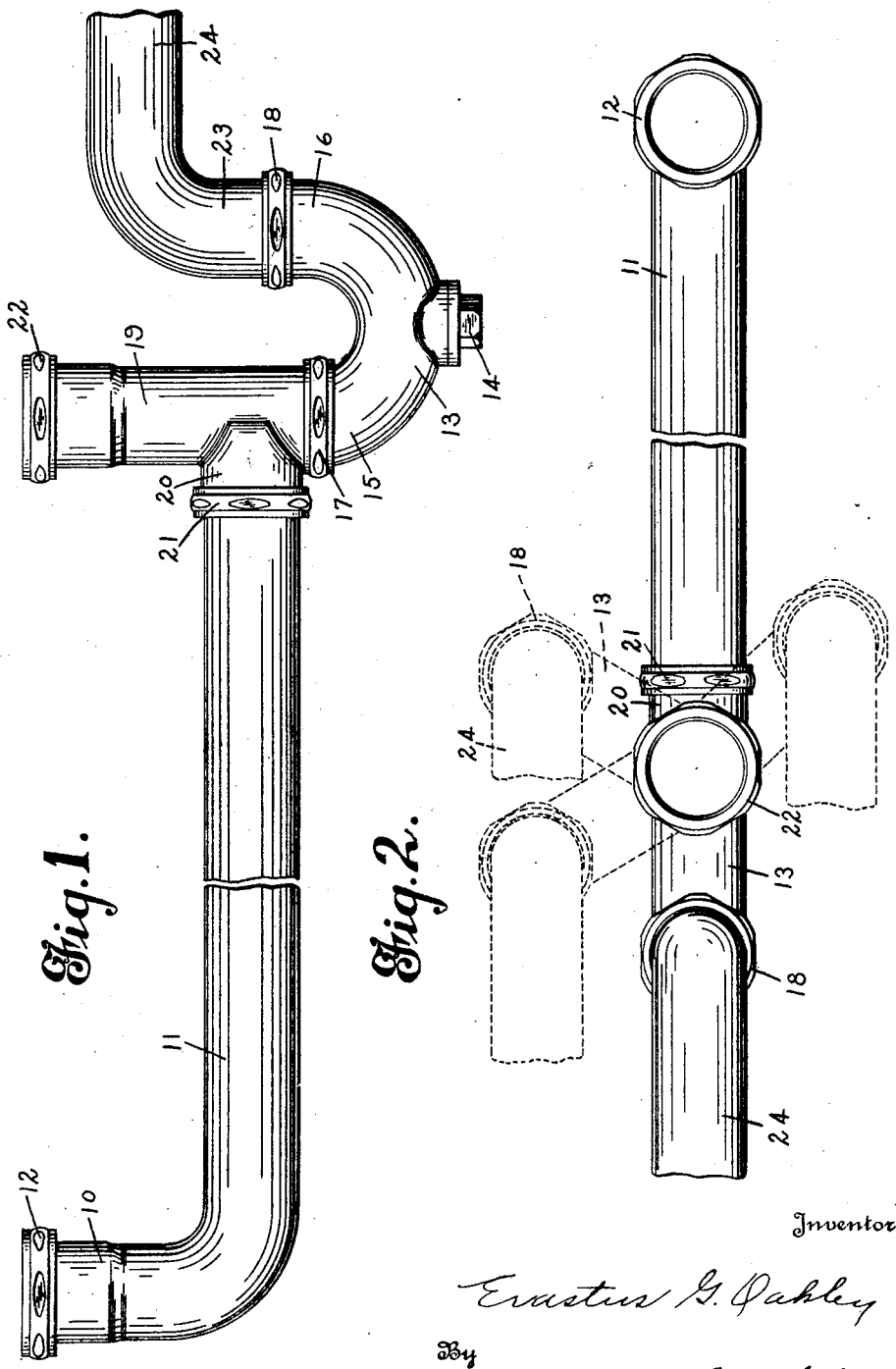

1,678,783

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

WASTE CONNECTION.

Application filed March 22, 1927. Serial No. 177,330.

This invention relates to waste connections for sinks, or the like, and is particularly adapted for use in connection with waste pipes for combined sinks and trays, or sinks having two outlets.

It is common at the present time, to employ plumbing fixtures which comprise combined sinks and trays, the two elements being combined in a unitary structure and having separate drain outlets. Usually these two drain outlets are connected to the same trap, and the waste is conducted through a single waste pipe from the trap for purposes of economy. When the usual form of trap is employed, there is a free air passage between the outlet of the tray and that of the sink, so that gas and odors from decaying matter in the connecting pipes may escape through these outlets into the room in which the fixture is installed.

I contemplate by my invention, the provision of such an arrangement to drain the sink and tray, that the horizontal connection leading from the tray outlet to the sink outlet will be sealed by the trap, so as to prevent the existence of an air passage from the tray outlet to the sink outlet.

Another object of my invention is to provide a more sanitary outlet for combined sinks and trays, or sinks having more than one outlet.

Another object of my invention is to provide an improved form of trap, which will not only seal, as far as possible, the outlet pipes connected to the sink, but will at the same time be capable of being turned at various angles relative to the connecting pipes.

A still further object of my invention is to provide a trap having a side inlet, and a swivel in each arm of the trap, so that the inlet will be effectually sealed and the trap may be disposed at various angles relative to the inlet and outlet pipes.

To these and other ends, the invention consists in the novel features and combinations of parts to be hereinafter described and claimed.

In the accompanying drawings:

Fig. 1 is a side elevational view of a combined sink and tray waste, embodying my invention;

Fig. 2 is a top plan view of the part shown in Fig. 1, various positions of the trap being shown in dotted lines.

To illustrate a preferred embodiment of my invention, I have shown a tray outlet pipe 10, having a horizontally extending portion 11, leading to the trap inlet, as will be explained hereinafter. At the upper end of the part 10, a hexagonal union nut 12 is provided for connection with the tray plug or pipe leading therefrom.

The trap, in this instance, is in the usual P-shaped form. The lower part of this trap consists of a U-shaped base member 13, having a cleanout plug 14, and relatively short legs 15 and 16. At the upper ends of the legs, hexagonal union nuts 17 and 18 are provided, in order that a swivel connection may be made with the upper parts of the trap.

To the leg 15 is connected a T member 19, the connection being such that, as shown in Fig. 2, the trap member 13 may be set at any desired angle relatively to the axis of the member 19. This T member has a side inlet 20 connected to the pipe 11 by the union 21, and at its upper end is provided with a union 22, for connection to the sink plug. It will be noted that the T inlet 20 is considerably nearer the lower end of the T member than to the upper end, so as to provide an inlet well down upon this leg of the trap, as will be explained hereinafter.

The leg 16 of the U member 13 is connected to an L-shaped pipe 23 by means of the union nut 18, so that this pipe may be set at any desired angle relatively to the member 13. It will be apparent, therefore, that the trap contains a double swivel, its angular position being adjustable at both of the unions 17 and 18.

The pipe 23 has a horizontally extending portion 24, through which the waste is carried to the sewer from both the sink and tray. It will be apparent that the trap, in this instance, consists of the pipe 23, the U-shaped portion 13 and the T member 19. The member 13 provides only the lower portion of the trap, as it will be obvious that in use water will stand in the trap at the level of the lower side of the pipe 24. This level will be above the upper side of the inlet 20 and pipe 11, so that the inlet to the trap will be below the upper end thereof, or in other words, the trap will be provided with a side inlet below the normal level of the water standing therein. For this reason, the inlet to the trap will be sealed and odors or gases from any foreign matter remaining in the pipe 11 will not be carried up through the pipes 10 and the T 19 to the sink and tray openings. These openings will be sealed from each other by the water standing in the pipe 11, due to the fact that the level of this pipe is below the lower side of the pipe 24.

While I have shown a trap in the usual P form, it will be understood, of course, that my invention may be embodied in a trap of S form, or any other form desired. Moreover, it will be obvious that while I have arranged to provide the trap with a side inlet, I have at the same time provided an arrangement which is extremely flexible, as the lower portion of the trap is connected by a swivel joint at both its inlet and outlet ends. In this manner, only the lower part of the trap is swiveled to the connecting structure and not the entire trap, as is the case in some installations.

While I have shown and described a preferred embodiment of my invention, it will be understood that it is not to be limited to all of the details shown, but is capable of modification and variation within the spirit of the invention and the scope of the appended claim.

What I claim is:

A combined sink and tray waste comprising a T member having a vertically disposed inlet for connection with the outlet of a sink or tray and a horizontally disposed inlet for connection to the outlet of the other of said members, a U shaped trap member, a swivel connecting one end of the U shaped member to the outlet of the T member, said swivel being carried closely adjacent the horizontally disposed inlet, an L shaped outlet member, a second swivel connecting the other end of the U member to said L shaped outlet, said second named swivel being carried above the first named swivel, whereby when standard types of L fittings are secured to said second named swivel the outlet portion of the L member will be above the horizontal inlet of the T member, whereby the latter may be sealed by the water in the trap.

In witness whereof, I have hereunto set my hand this 19th day of March, 1927.

ERASTUS G. OAKLEY.